United States Patent
Yamamoto

(10) Patent No.: US 11,086,284 B2
(45) Date of Patent: Aug. 10, 2021

(54) CONTROLLER FOR MACHINE TOOL

(71) Applicant: FANUC CORPORATION, Yamanashi (JP)

(72) Inventor: Kenta Yamamoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/376,494

(22) Filed: Apr. 5, 2019

(65) Prior Publication Data

US 2019/0310600 A1  Oct. 10, 2019

(30) Foreign Application Priority Data

Apr. 6, 2018 (JP) .............................. JP2018-073775

(51) Int. Cl.
*G05B 19/18* (2006.01)
*G05B 19/19* (2006.01)

(52) U.S. Cl.
CPC .......... *G05B 19/182* (2013.01); *G05B 19/19* (2013.01); *G05B 2219/34049* (2013.01); *G05B 2219/45215* (2013.01)

(58) Field of Classification Search
None
See application file for complete search history.

(56) References Cited

U.S. PATENT DOCUMENTS 9,886,022 B2 *  2/2018  Watanabe ............ B23Q 15/013
10,589,367 B2 *  3/2020  Sannomiya ........... B23Q 15/12

(Continued)

FOREIGN PATENT DOCUMENTS

DE   112014007112 T5 *  7/2017  ......... G05B 19/4093
JP         5851670 B1    2/2016
(Continued)

OTHER PUBLICATIONS

An Office Action; "Notice of Reasons for Refusal," mailed by the Japanese Patent Office dated Sep. 29, 2020, which corresponds to Japanese Patent Application No. 2019-072035 and is related to U.S. Appl. No. 16/376,494 with English language translation.

*Primary Examiner* — Mohammad Ali
*Assistant Examiner* — David Earl Ogg
(74) *Attorney, Agent, or Firm* — Studebaker & Brackett PC

(57) ABSTRACT

To provide a controller for a machine tool capable of shredding chips and capable of performing machining by cutting correctly without implementation of a so-called finishing process. A controller for a machine tool includes: an oscillation command generation unit that generates an oscillation command for causing a work and a tool to oscillate relative to each other in a radial direction of the work based on a condition for oscillation; a movement command generation unit that generates a movement command for causing the work and the tool to move relative to each other for thread cutting of the work; an adder that adds the oscillation command and the movement command; and a determination unit that predetermines whether the oscillation command is to be added to the movement command, is which the adder outputs a superimposed command configured to include one or more types of machining patterns combining an arbitrary number of a total movement command with the oscillation command added, and an arbitrary number of a total movement command without the oscillation command added, in accordance with a result of determination by the determination unit.

9 Claims, 9 Drawing Sheets

(56) References Cited

U.S. PATENT DOCUMENTS

| | | | | |
|---|---|---|---|---|
| 2009/0107308 A1* | 4/2009 | Woody | ............... | B23B 1/00 |
| | | | | 82/1.11 |
| 2018/0067466 A1* | 3/2018 | Sonoda | ............... | G05B 19/29 |
| 2018/0281090 A1* | 10/2018 | Watanabe | ............ | G05B 19/186 |

FOREIGN PATENT DOCUMENTS

| | | |
|---|---|---|
| JP | 2017-091468 A | 5/2017 |
| WO | 2016/056526 A1 | 4/2016 |
| WO | 2016-067372 A1 | 5/2016 |

\* cited by examiner

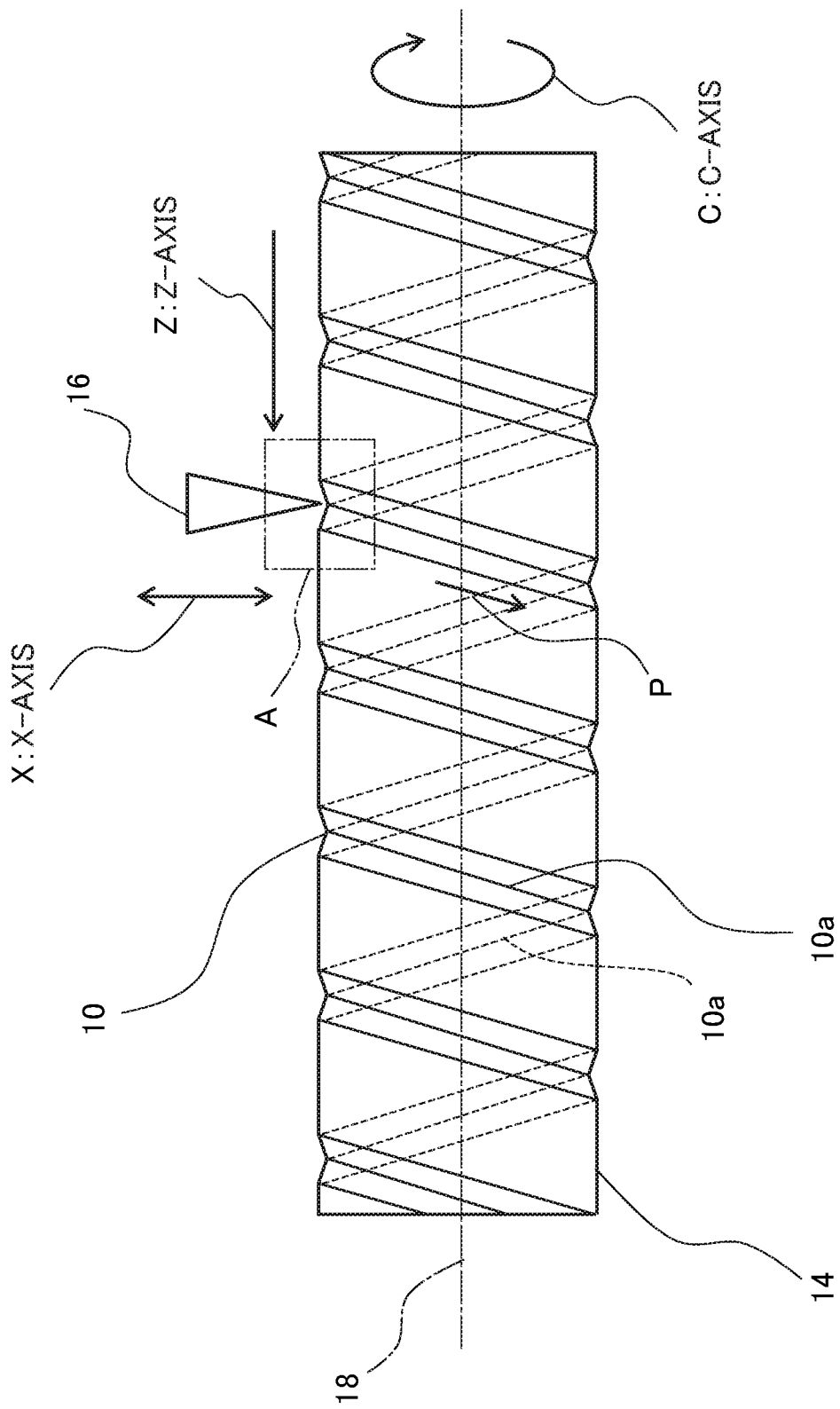

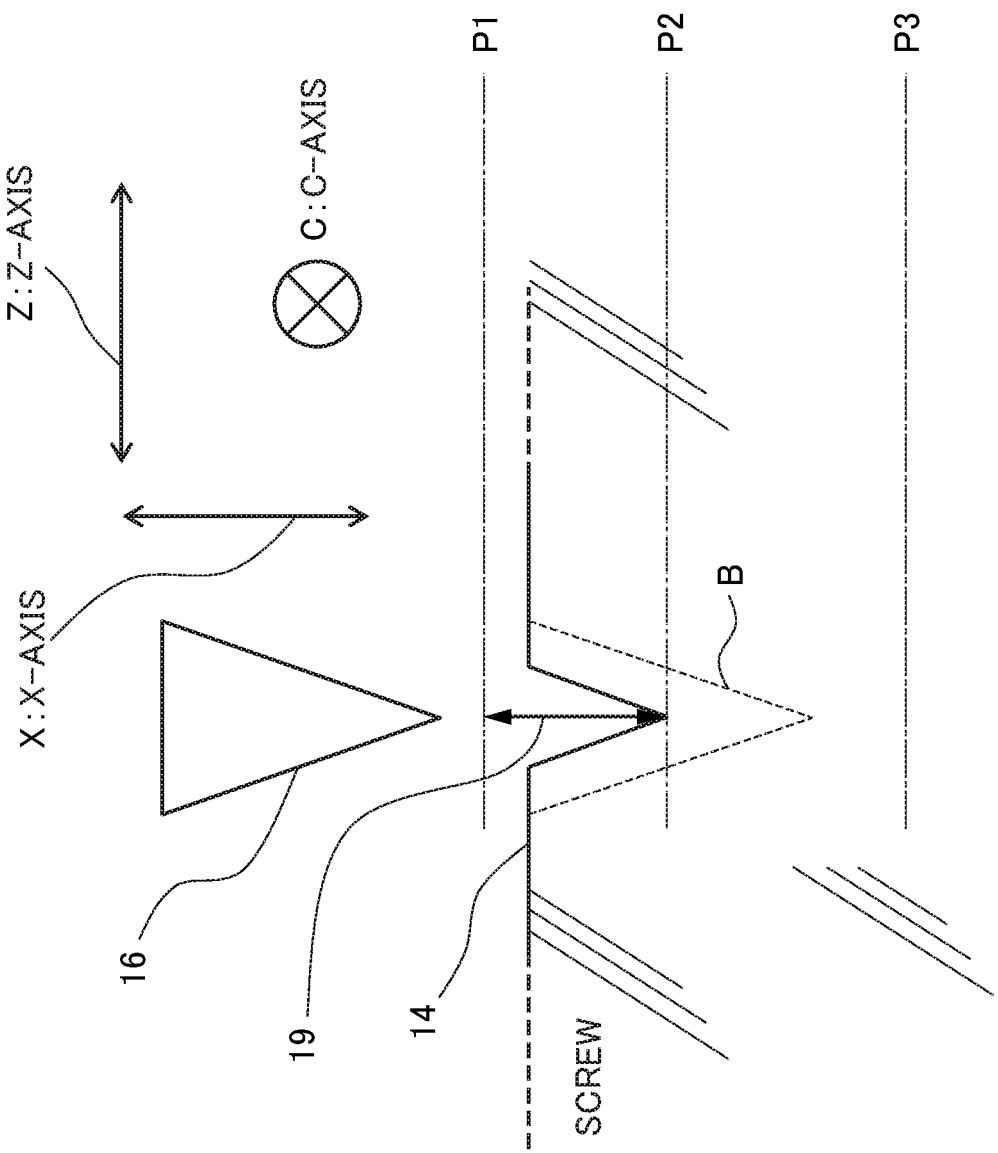

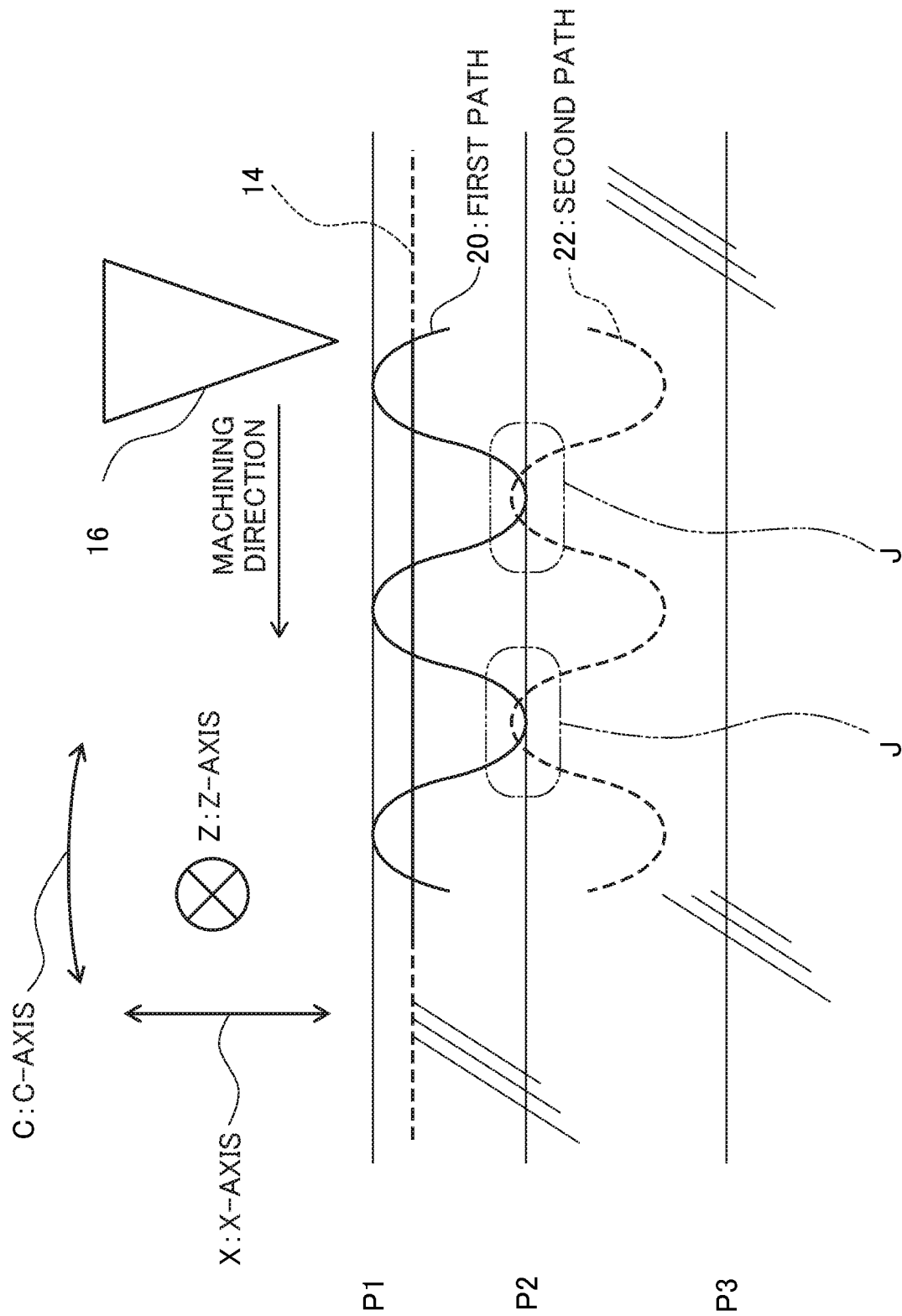

CONTROLLER FOR MACHINE TOOL

This application is based on and claims the benefit of priority from Japanese Patent Application No. 2018-073775, filed on 6 Apr. 2018, the content of which is incorporated herein by reference.

BACKGROUND OF THE INVENTION

Field of the Invention

The present invention relates to a controller for a machine tool used for thread cutting. The present invention particularly relates to a controller for a machine tool capable of shredding chips occurring during thread cutting efficiently.

Related Art

Thread cutting has been performed in various methods. In many cases, a machine tool including multiple axes has been used for thread cutting by means of coordinated motion of the multiple axes, for example. Such thread cutting is realized by lathe-turning machining of a surface of a circular cylindrical work in a spiral pattern. This lathe-turning machining is repeated on the surface of the circular cylindrical work. By doing so, a thread groove 10 having a sufficient depth is finally formed as shown in FIG. 6 to finish machining of a screw 12 as a whole.

FIG. 7 shows a state when the lathe-turning machining is being performed. As indicated by P in FIG. 7, the thread groove 10 is cut into a work 14 by cutting with a cutting tool 16 several times along a predetermined path 10a (position of the thread groove 10) on the work 14. FIG. 9 shows a state immediately after the start of the cutting where the thread groove 10 is shallow. By repeating the cutting many times, the thread groove 10 is formed into a great depth (see FIG. 6) to finish formation of the screw 12 as a finished part. As shown in FIG. 9, the path 10a also exists on the back side of the work 14. The path 10a on the back side is indicated by dashed lines for facilitating understanding. In FIG. 7, for the nature of the path 10a, the path 10a is drawn as the same line as the thread groove 10 for the sake of convenience.

In FIG. 7, the work 14 is attached to a spindle axis 18 and rotates. The work 14 rotates in a manner indicated by a circular arrow C drawn as an arrow surrounding the spindle axis 18. A rotating coordinate axis indicated by the arrow C is called a C-axis. In other words, the C-axis corresponds to angular coordinates indicating an angle about the spindle axis.

The cutting tool 16 moves along the path 10a on the surface of the rotating work 14 for machining the thread groove 10 by cutting. To achieve this, the cutting tool 16 is required to move along a Z-axis (see FIG. 7) as a coordinate axis extending in the lengthwise direction of the work 14 in synchronization with the rotation of the work 14 in the C-axis direction. An arrow Z indicates the direction of a Z coordinate axis (hereinafter called the Z-axis).

By such movement of the cutting tool 16 in the Z-axis direction, the thread groove 10 having what is called a spiral pattern is cut to form the screw 12. If the cutting tool 16 moves fast in the Z-axis direction, the thread groove 10 follows a steeper spiral pattern. If the cutting tool 16 moves slowly in the Z-axis direction, the thread groove 10 follows a gentler spiral pattern.

As described above, cutting is performed several times. At first, the thread groove 10 is formed into a shallow depth. After repeating the cutting many times, the thread groove 10 is formed into a greater depth. More specifically, the cutting tool 16 is controlled in such a manner that, as a result of each cutting, the cutting tool 16 gradually moves in the direction of an X coordinate axis (see FIG. 7) perpendicular to the surface of the work 14 for cutting of the work 14 at a gradually deepened position. An arrow X indicates the direction of the X coordinate axis (hereinafter called an X-axis). As a result of such control, formation of the screw 12 shown in FIG. 7 is finally finished.

In the foregoing thread cutting, chips are also required to be shredded properly. To achieve this, various techniques have been suggested. For example, patent document 1 discloses a technique relating to a device for thread cutting by means of a cutting-in process performed several times. According to this technique, vibration is superimposed on the movement of a driving axis to determine different vibration phase shift amounts between the cutting-in processes. Patent document 1 states that this device allows fragmentation of chips with vibration by adjusting a vibration phase properly in each cutting-in process.

Patent document 2 discloses a device including means of causing reciprocating vibration in a radial direction of a work, and vibration setting means that sets a vibration pattern for each cutting-in process involving the reciprocating vibration in such a manner that a part already machined by a different cutting-in process is partially present in a part to be machined by a predetermined cutting-in process. Patent document 2 states that, with this configuration, chips occurring during cutting are fragmented.

Patent Document 1: Japanese Patent No. 5851670 Patent Document 2: PCT International Publication No. WO2016/056526

SUMMARY OF THE INVENTION

FIG. 8 shows the thread cutting described in patent document 2 mentioned above, for example. FIG. 8 is an enlarged view of an area A at a tip portion of the cutting tool 16 of FIG. 7. In FIG. 8 showing the area A, the C-axis is a coordinate axis extending in a direction substantially perpendicular to the drawing. The X-axis and the Z-axis extend in their directions similar to those of FIG. 7. As shown in FIG. 8, the cutting tool 16 also makes reciprocating motion along the X-axis in response to a speed command for the X-axis. This motion is oscillation 19 (see FIG. 8). In FIG. 8, P1, P2, and P3 indicate corresponding positions on the X-axis. The signs P1, P2, and P3 indicate positions on the work 14 in a radial direction. As shown in FIG. 7, the work 14 rotates about the spindle axis 18 as a rotary axis, and P1, P2, and P3 also show positions in the radial direction viewed from the spindle axis 18 as a center. The signs P1, P2, and P3 are common to FIG. 9 and given for facilitating understanding of correspondence between radial positions in FIG. 9.

Applying the oscillation 19 of FIG. 8 causes the cutting tool 16 to move back and forth between the position P1 and the position P2. Thus, in some places, the work 14 is cut to the position P2. An originally intended position of the thread groove 10 to realize the screw 12 is indicated by B. The oscillation 19 in the X-axis direction is generated cutting-in and cutting-out. The cutting-in means oscillation is applied in a direction in which the cutting tool 16 gets closer to the work 14. The cutting-out means oscillation is applied in a direction in which the cutting tool 16 gets farther away from the work 14. In particular, the thread groove 10 is cut to a predetermined depth by the cutting-in.

FIG. 9 shows a view taken from the direction of an arrow D of FIG. 8. As this view is taken from the arrow D, the Z-axis is an axis extending in a direction perpendicular to the drawing instead of the C-axis. The C-axis is a rotating coordinate axis, so it should correctly be a coordinate axis extending in an arc-like pattern. However, in a narrow range such as that of FIG. 8, the C-axis can be approximated to substantially linear coordinates, as shown in FIG. 9.

As shown in FIG. 9, according to patent document 2, when the cutting tool 16 moves in a machining direction (C-axis direction), oscillating motion in the X-axis direction (radial direction of the work 14) is made, as described above. As has been described by referring to FIG. 8, this oscillation 19 is oscillation between the position P1 and the position P2. The oscillation 19 gradually moves to a deeper position on the work 14. Specifically, the oscillation 19 gradually moves to a lower position in the radial direction of the work 14. Such move is also shown in FIG. 9. As shown in FIG. 9, the oscillation 19 applied for the first time in machining by cutting (called a first path) is oscillation between the position P1 and the position P2. As understood from FIG. 9, the oscillation 19 applied for the second time in the machining by cutting (called a second path) moves to a deeper position. At this time, regarding the oscillation 19 along the second path, the phase of this oscillation 19 is set in such a manner that a part already machined by a different cutting-in process (first path) is partially present in a part to be machined by a cutting-in process (second path). These parts are indicated by J in FIG. 9.

Patent document 2 states that, as a result of the foregoing, chips can be shredded by passing the cutting tool through space where cutting has been finished. As described above, patent document 2 discloses causing reciprocating motion in the radial direction of the work 14 (an oscillation command generation unit 104 described later is responsible for generation of an oscillation command for such motion). Patent document 2 discloses setting of a vibration pattern for each cutting-in process involving the reciprocating motion in such a manner that a part already machined by a different cutting-in process is partially present in a part to be machined by a predetermined cutting-in process (the oscillation command generation unit 104 described later is responsible for generation of an oscillation command for such motion). As described above, according to the invention of patent document 2, chips can be shredded in machining by cutting performed along the second path and its subsequent paths.

However, in the conventional technique of applying such oscillation to thread cutting, this oscillation might cause influence on the shape of a product resulting from machining by cutting. This has required machining by cutting not involving oscillation as finishing to be always performed along a final path, causing a likelihood that the machining by cutting will become a complicated process. Hence, a tendency toward longer time consumed by the machining by cutting has been observed.

The present invention has been made in view of the foregoing problem and is intended to provide a controller for a machine tool capable of shredding chips and capable of performing machining by cutting correctly without implementation of a so-called finishing process.

As a result of concentrated studies on the foregoing problem, the present inventors have conceived an idea that, by making a cut in advance before implementation of normal machining by cutting (thread cutting), chips will be shredded automatically in the subsequent normal thread cutting by way of passage of a cutting tool through the cut. Based on this idea, the present inventors have achieved the invention as follows.

(1) The present invention provides a controller (controller 100 described later, for example) for a machine tool used for thread cutting on a work (work 214 described later, for example) by repeating motion of moving a tool (tool 216 described later, for example) in a rotary axis direction in synchronization with rotation of the work several times, while cutting-in in a radial direction, the controller including: an oscillation command generation unit (oscillation command generation unit 104 described later, for example) that generates an oscillation command for causing a work and a tool to oscillate relative to each other in a radial direction of the work based on a condition for oscillation; a movement command generation unit that generates a movement command for causing the work and the tool to move relative to each other for thread cutting of the work; an adder (control unit 108 described later, for example) that adds the oscillation command and the movement command; and a determination unit (oscillation command ON/OFF determination unit 102 described later, for example) that predetermines whether the oscillation command is to be added to the movement command, in which the adder outputs a superimposed command configured to include one or more types of machining patterns combining an arbitrary number of total movement commands with the oscillation command added, and an arbitrary number of total movement commands without the oscillation command added, in accordance with a result of determination by the determination unit. As a result, the oscillation command has the same phase for each cutting-in in the radial direction, thereby enabling chips to be efficiently shredded. Chips can be shredded in a process uninvolving oscillation as well as a process involving oscillation.

(2) In the controller described in (1), the determination unit may inspect a machining program for the thread cutting on the work, and may determine whether the oscillation command is to be added to the movement command.

(3) In the controller described in (1) or (2), the determination unit may output a command so as to be composed of the total movement command with the oscillation command added, until a cut made by the relative oscillation between the work and the tool in the radial direction of the work reaches the bottom of a thread groove as a target of the thread cutting, and may output a command so as to be composed of the total movement command without the oscillation command added, after the cut made by the relative oscillation between the work and the tool in the radial direction of the work reaches the bottom of the thread groove as the target of the thread cutting.

(4) In the controller described in any one of (1) to (3), the oscillation command generation unit may generate the oscillation command in such a manner that a part already machined by a different cutting-in process is absent in each cutting-in process with oscillation of causing the work and the tool to oscillate relative to each other in the radial direction of the work.

(5) In the controller described in any one of (1) to (4), the oscillation command generation unit may generate the oscillation command for applying oscillation at an oscillation frequency obtained by multiplying the rotation speed of a spindle axis to rotate the work by a predetermined constant.

(6) In the controller described in any one of (1) to (5), the oscillation command generation unit may generate the oscillation command in such a manner that, as the thread cutting on the work proceeds, the amplitude of the relative oscillation between the work and the tool in the radial direction of the work becomes greater for each path.

(7) In the controller described in any one of (1) to (6), the oscillation command generation unit may generate the oscillation command in such a manner that, as the thread cutting on the work proceeds, an offset of the start position of the relative oscillation between the work and the tool in the radial direction of the work becomes greater for each path.

According to the present invention, making a cut in advance allows shredding of chips during machining by cutting. The chips can be shredded without making oscillating motion, so that the quality of a machining surface is not degraded with oscillation.

BRIEF DESCRIPTION OF THE DRAWINGS

FIG. 7 is an explanatory view showing how the thread cutting is being performed for forming the screw;

FIG. 8 is an enlarged view of an area A of FIG. 4 and is an explanatory views showing thread cutting involving oscillation in an X-axis direction, namely, relative oscillation between a work and a cutting tool and oscillation in a radial direction of the work; and FIG. 9 is an explanatory view showing the thread cutting taken from the direction of an arrow D of FIG. 5 involving oscillation in the X-axis direction, namely, relative oscillation between the work and the cutting tool and oscillation in the radial direction of the work.

DETAILED DESCRIPTION OF THE INVENTION

An embodiment of the present invention will be described below based on the drawings. In describing second and subsequent embodiments below, descriptions of configurations common to the first embodiment are omitted.

First Embodiment

Figure 1:
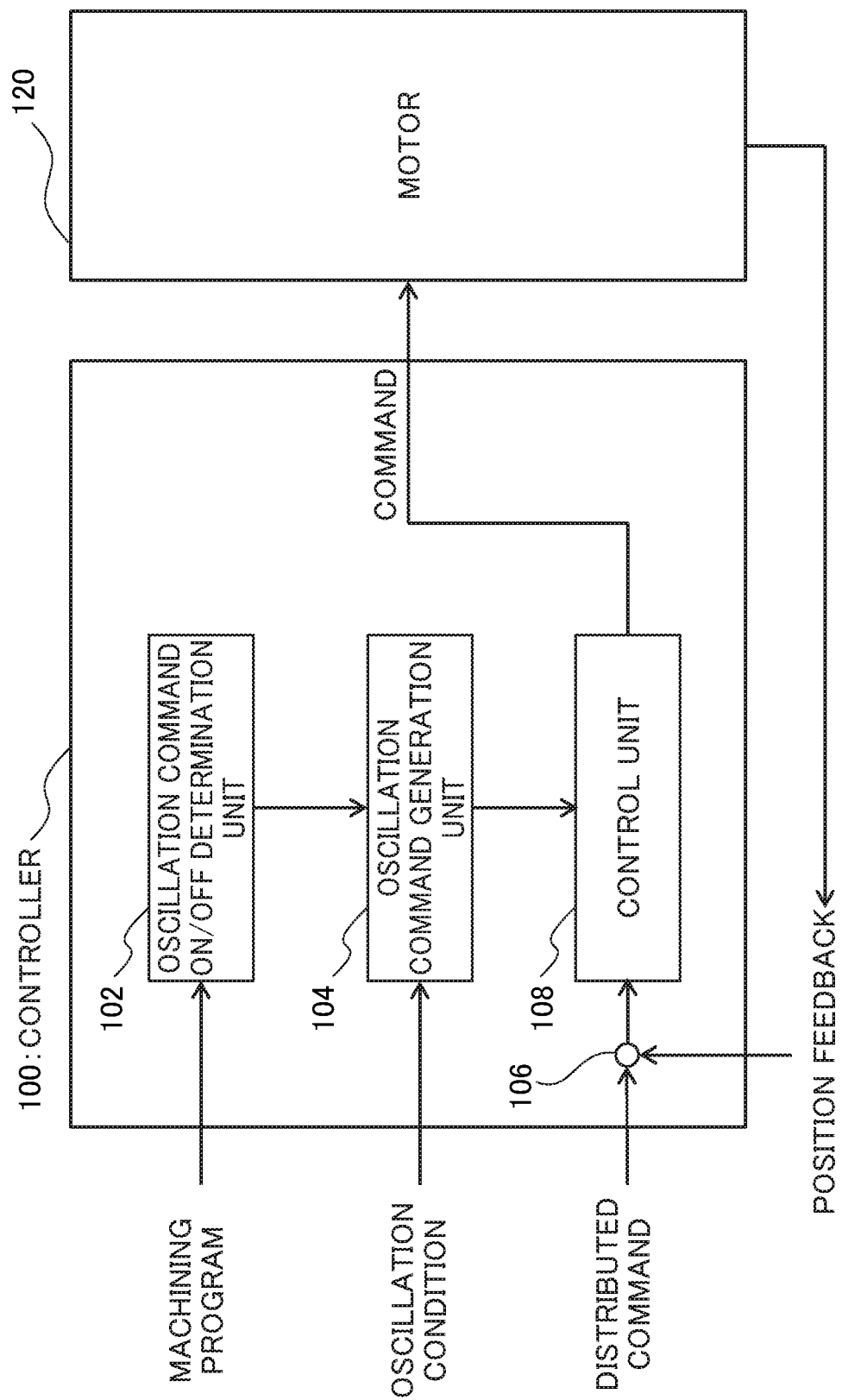
FIG. 1 is a functional block diagram showing the configuration of a controller for a machine tool according to a first embodiment.

FIG. 1 is a functional block diagram showing the configuration of a controller 100 for a machine tool according to the embodiment. As shown in FIG. 1, the controller 100 includes an oscillation command ON/OFF determination unit 102, an oscillation command generation unit 104, an adder 106, a control unit 108, and a movement command generation unit (not shown). The controller 100 is a controller for a machine tool used for thread cutting on a work, by repeating motion of moving a tool in a rotary axis direction in synchronization with rotation of the work several times, while cutting-in in a radial direction. This controller 100 may be what is called a servo controller. These structures of the controller 100 may be configured using programs describing respective motions by these structures and a CPU to execute these programs. The controller 100 may be configured as a computer. A CPU in this computer may execute programs describing the respective functions of these structures of the controller 100 to realize the structures.

The oscillation command ON/OFF determination unit 102 receives a machining program from outside, determines whether an oscillation command is to be applied to a movement command. In the embodiment, the machining program is inspected to determine whether applying oscillation to machining by cutting in this machining program will cause adverse influence on the quality of a final machining surface. As a result, if it is considered that this machining by cutting is finishing and applying oscillation will cause influence on the machining surface with the oscillation to cause adverse influence on a machining quality, it is determined that the oscillation is not to be applied. Then, a control unit described later having an adder outputs the superimposed command indicating that the oscillation command is not to be applied. Meanwhile, if it is considered that applying oscillation to this machining by cutting will not cause influence on finishing (the quality of the machining surface) of a work 214, it is determined that the oscillation is to be applied to the movement command. Then, the control unit described later having the adder outputs the superimposed command indicating that the oscillation command is to be applied.

The machining program is a program describing motion in lathe-turning machining on the work 214. Thus, inspecting the machining program makes it possible to determine whether applying an oscillation command to a movement command for the motion in the lathe-turning machining will cause influence on a final machining surface. The machining program may be supplied to the oscillation command ON determination unit 102 using various interfaces. In the illustration of FIG. 1, the machining program is supplied from the outside of the controller 100. Alternatively, the machining program may be stored in the controller 100.

The oscillation command ON/OFF determination unit 102 can be configured using a program describing the foregoing motion, a CPU to execute the program, and an input interface for input of the machining program. As described above, if the machining program is stored in the controller 100, provision of this input interface is not always required.

The embodiment is characterized in that, in the case of machining motion other than final finishing, this machining motion is determined not to cause influence on a final machining surface, and the superimposed command for applying oscillation is output. As a result, a cut can be made along a thread cutting path while the oscillation is applied. If it is likely that the final machining surface will be influenced adversely like in the case of final finishing, the superimposed command is output so as not to apply oscillation. This makes it possible to perform machining along the thread cutting path without the application of oscillation.

The oscillation command generation unit 104 generates an oscillation command to be superimposed on a movement command for each axis for thread cutting of the work 214, for example. The oscillation command generation unit 104 receives an oscillation condition from outside and generates an oscillation command under the oscillation condition. The oscillation condition may include the cycle (frequency), amplitude, phase, etc. of oscillation. Oscillation may be applied in the form of a sine wave, for example. Meanwhile, any cyclic signal such as a triangular wave signal is also applicable, for example. The oscillation condition may be input through a predetermined input interface. For example, an operator may input the oscillation condition through a keyboard or a mouse. Alternatively, the oscillation condition may be input from a different computer through a predetermined communication interface.

The embodiment is characterized in that output of an oscillation command is controlled. Not outputting the oscillation command may include outputting a signal having a value "0" as the oscillation command, outputting a signal indicating that oscillation is not to be applied, etc. The oscillation command generation unit 104 can also be configured using a program describing the motion by the oscillation command generation unit 104, and a CPU to execute the program. The oscillation command generation unit 104 may also include a predetermined interface for input of an oscillation condition.

The adder 106 receives the foregoing movement command (distributed command) supplied from an oscillation command generation unit (not shown) or a higher-order controller. This movement command is a movement command distributed to the device (controller 100) to which the adder 106 belongs, so it will be called a distributed command. For example, the higher-order controller may extract a movement command only for a motor 120 from a program for machining to be performed by a factory as a whole, and the extracted movement command may be distributed. The adder 106 subtracts a position feedback value transmitted from the motor 120 from this movement command (distributed command) and outputs positional deviation resulting from the subtraction to the control unit 108. By doing so, it becomes possible to perform what is called position feedback control.

The control unit 108 generates a command for driving the motor 120 in response to the input positional deviation and outputs the generated command to the motor 120. Based on this command, the motor 120 for a cutting tool is driven to move the cutting tool relative to the work.

More specifically, the control unit 108 of the present embodiment is configured to include an adder, and outputs a superimposed command configured to include one or more types of machining patterns combining an arbitrary number of total movement commands with an oscillation command added, and an arbitrary number of total movement commands without the oscillation command added, in accordance with a result of determination by the oscillation command ON/OFF determination unit 102.

One of the characteristics of the controller 100 of the embodiment is that, in order to shred chips occurring during thread cutting, the work 214 and a cutting tool 216 are caused to oscillate relative to each other in a radial direction of the work 214 to make a cut, and then normal thread cutting is performed.

Figure 2:
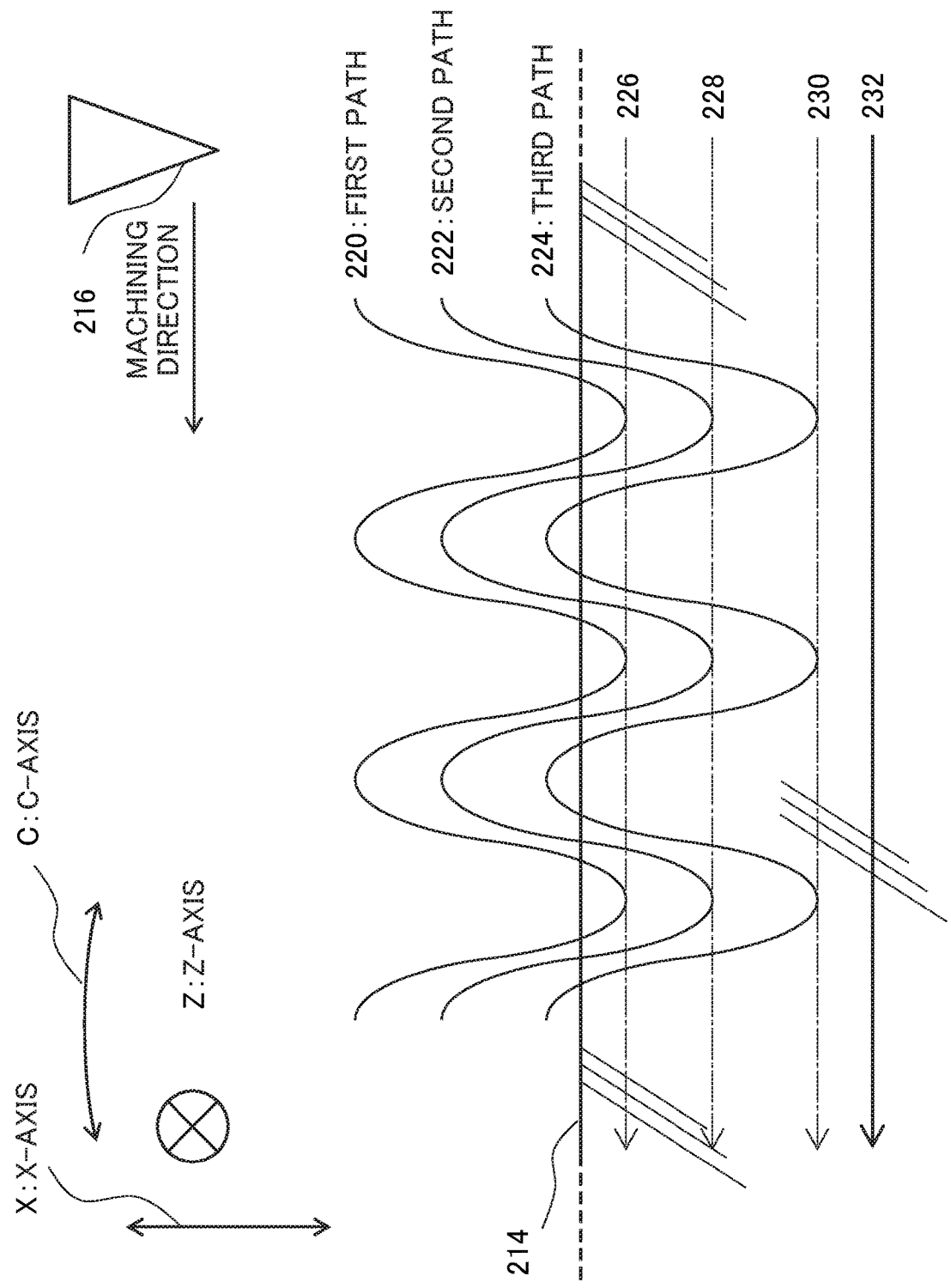
FIG. 2 is an explanatory view showing an example of normal thread cutting motion made after making of cutting-in motion involving relative oscillation between a work and a cutting tool corresponding to oscillation in a radial direction of the work according to the first embodiment.
Figure 6:
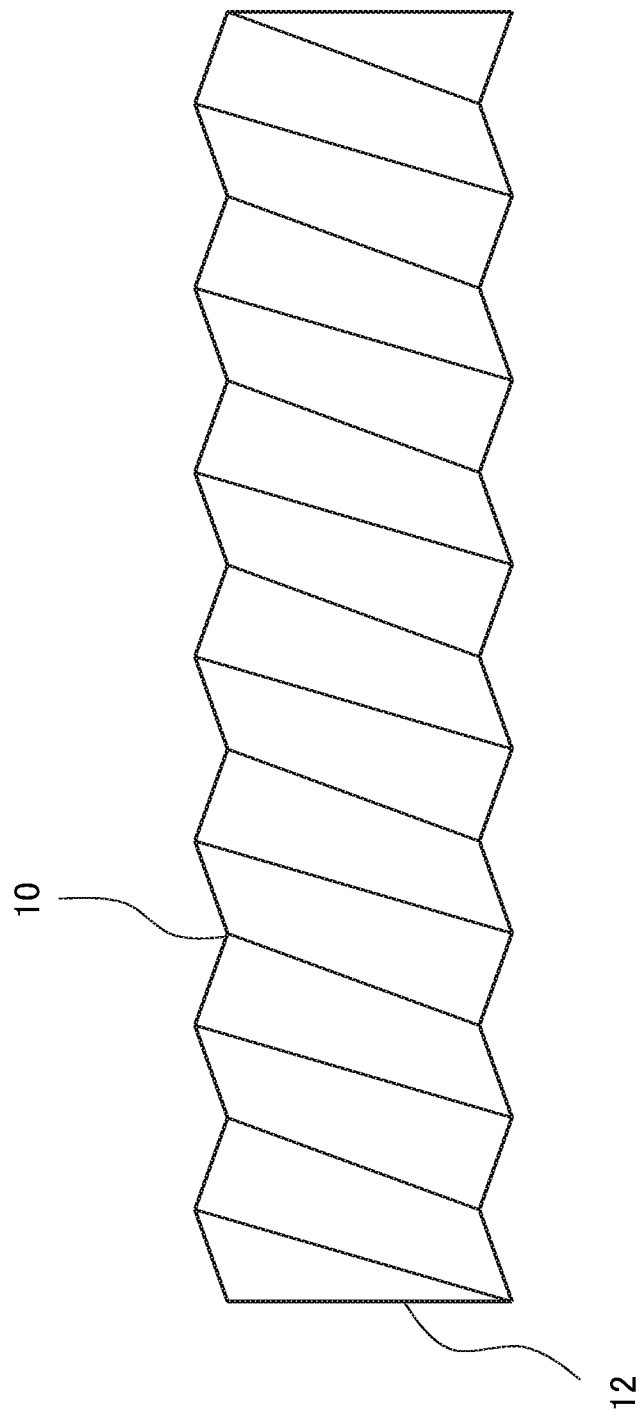
FIG. 6 shows the appearance of a screw formed by the thread cutting.

FIG. 2 shows how thread cutting of the embodiment is performed. FIG. 2 is a view of the work 214 taken from a similar direction to the direction of FIG. 6 showing the conventional technique. Like in FIG. 9, the Z-axis extends in a direction perpendicular to the drawing. Like in FIG. 9, oscillation is applied in the X-axis direction and the cutting tool 216 moves in the C-axis direction. Specifically, like in FIG. 9, a machining direction is parallel to the C-axis. This oscillation applied in the X-axis direction is oscillation in the radial direction of the work 214 and relative oscillation between the work 214 and the cutting tool 216.

Like in FIG. 9, machining proceeds in FIG. 2 in response to cutting with the cutting tool 216 several times on the work 214. However, unlike in FIG. 9, a machined part resulting from a different cutting-in process (first path 220) is absent in a part to be machined by one cutting-in process (second path 222) (see FIG. 2).

As shown in FIG. 2, machining by cutting involving the foregoing oscillation in the X-axis direction is performed several times along the first path 220, the second path 222, and a third path 224, for example. After each machining by cutting, a cut-in depth becomes greater. In the machining by cutting along the first path 220, for example, cutting-in motion reaches a depth 226. In the machining by cutting along the second path 222, cutting-in motion reaches a depth 228. In the machining by cutting along the third path 224, cutting-in motion reaches a depth 230. Oscillation conditions such as amplitude are set for each of the cutting-in involving oscillation, in such a manner that each cutting-in path is positioned more outward from the surface of the work 214 in the radial direction. This enables chips to be shredded in each of the cutting-in involving oscillation as well.

As described above, in the embodiment, cutting-in motion proceeds while oscillation is applied to machining by cutting by which applying the oscillation will not cause influence on a final machining surface. This motion continues until immediately before adverse influence is caused on the final machining surface. In the case of FIG. 2, the oscillation command ON/OFF determination unit 102 determines that applying oscillation in making cutting motion along a fourth path deeper than the third path 224 will cause adverse influence on the final machining surface. In FIG. 2, the final machining surface is indicated as 232.

Thus, in the illustration of FIG. 2, the oscillation command ON/OFF determination unit 102 determines not to apply oscillation along the fourth path. More specifically, the oscillation command ON/OFF determination unit 102 outputs the superimposed command indicating that an oscillation command is not to be superimposed in machining by cutting along the fourth path. As a result, the oscillation command generation unit 104 does not output an oscillation command (or outputs an oscillation command having a value "0"). In this case, a movement command (distributed command) is output to the motor 120 without application of oscillation.

As a result, machining by cutting along the fourth path (not shown) is performed on the work 214 so as to form the final machining surface 232. A cut has already been made through the machining by cutting along paths from the first path 220 to the third path 224. Thus, while oscillation is not applied to the fourth path itself, chips can still be shredded. In the embodiment, as a result of the absence of application of oscillation to the final fourth path as a path for finishing, the resultant machining surface can be given high accuracy. Oscillation is always applied according to the conventional technique. This requires precise machining by cutting for final finishing. By contrast, the embodiment does not require such finishing to be performed separately to achieve more prompt machining by cutting.

In the embodiment, machining by cutting includes "a first step for making a cut with oscillation" and "a subsequent step performed after making of the cut and for machining a thread groove without oscillation" performed separately. Thus, by the presence of the cut already made, even in final machining by cutting of a thread groove (not involving oscillation), chips can still be shredded, and a machining surface with high accuracy can be formed. According to the embodiment, if the final machining surface is to be influenced adversely, machining by cutting is performed without application of oscillation. This makes it possible to realize the controller 100 achieving machining by cutting without being influenced by a machining condition or a machining method for cutting.

Figure 3:
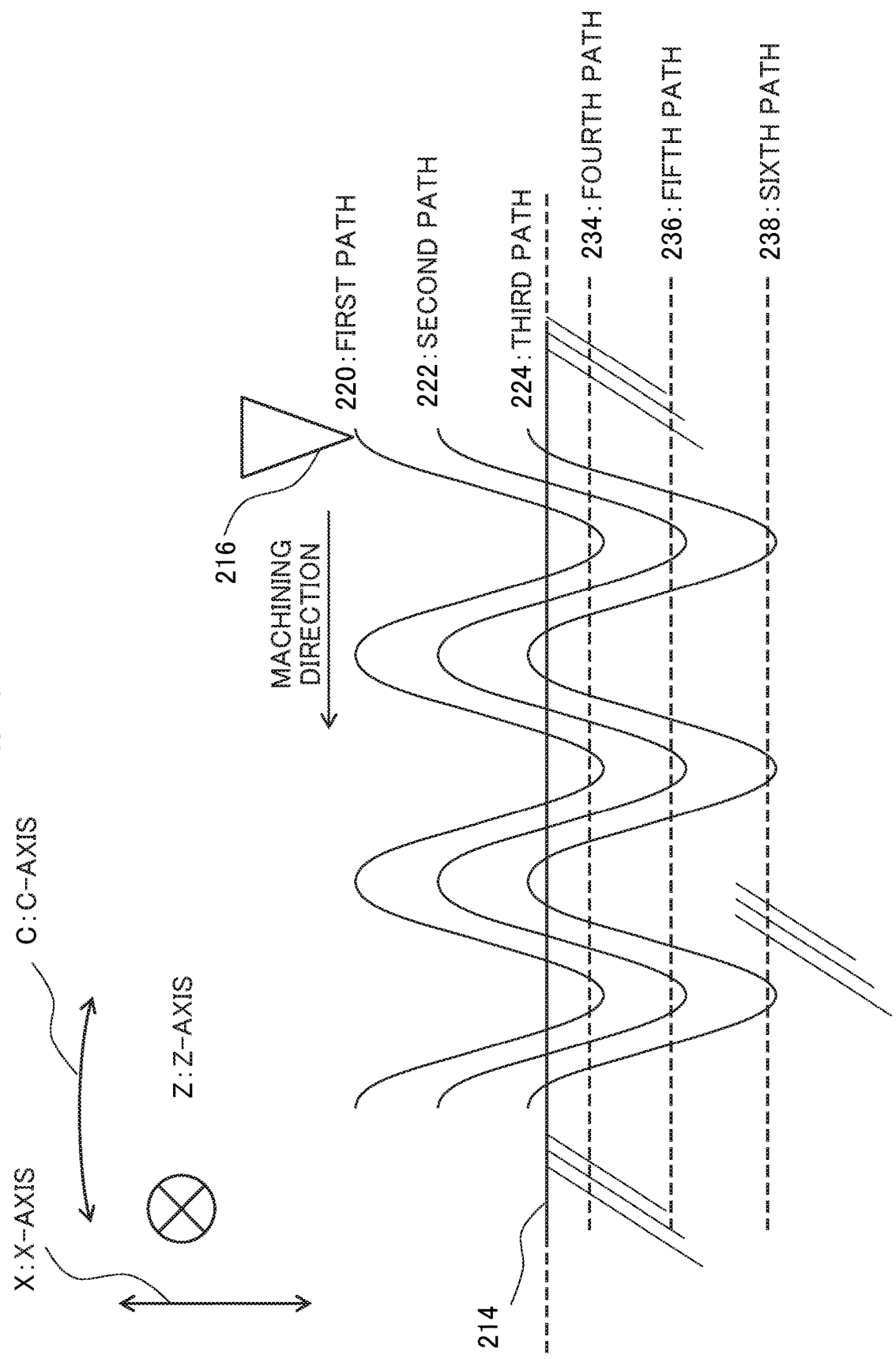
FIG. 3 is an explanatory view showing an example of cutting-in motion uninvolving oscillation along fourth to sixth paths, as a variation of the first embodiment.

FIG. 3 is an explanatory view showing an example of cutting-in motion uninvolving oscillation along fourth to sixth paths, as a variation of the present embodiment. As shown in FIG. 3, the cutting-in uninvolving oscillation along the fourth path is performed so as to include a part already machined in the cutting-in involving oscillation along the first path. (Although it is only necessary to include one part, in reality, as shown in FIG. 3, the part already machined having a predetermined size or larger is included, and this applies to the fifth and sixth paths.) Likewise, the cutting-in uninvolving oscillation along the fifth path is performed so as to include a part already machined in the cutting-in involving oscillation along the second path; and the cutting-in uninvolving oscillation along the sixth path is performed so as to include a part already machined in the cutting-in involving oscillation along the third path. This enables chips to be shredded in any one of the cutting-in uninvolving oscillation along the fourth to sixth paths as well.

Second Embodiment

Figure 4:
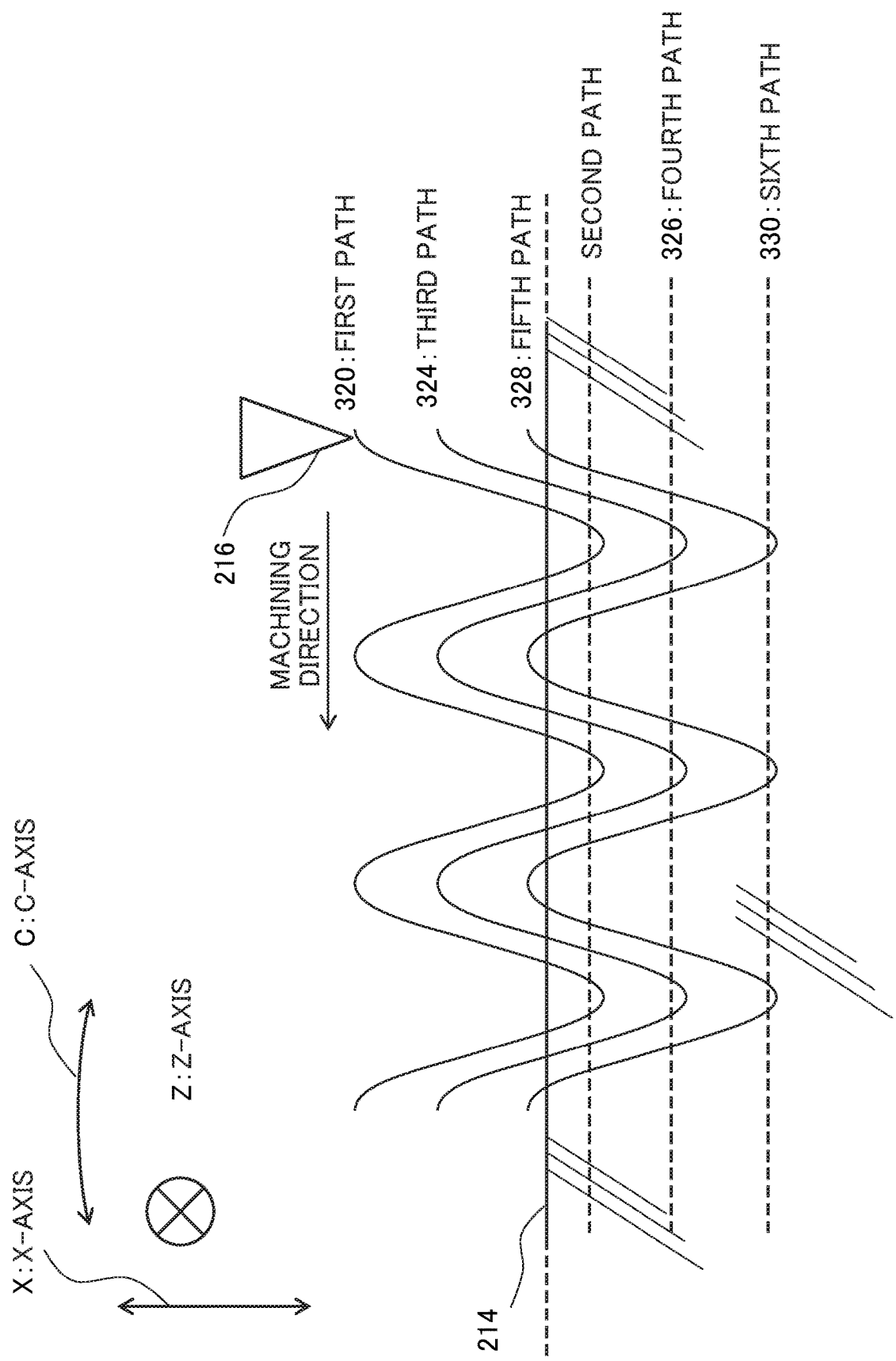
FIG. 4 is an explanatory view showing an example of thread cutting motion according to a second embodiment.

FIG. 4 is an explanatory view showing an example of thread cutting motion according to a second embodiment. The present embodiment differs from the first embodiment only in combinations of cutting-in involving oscillation and cutting-in uninvolving oscillation. In the present embodiment, one cutting-in motion involving relative oscillation between the work and the tool in the radial direction of the work and one cutting-in motion uninvolving oscillation are alternately performed. More specifically, as shown in FIG. 4, the cutting-in involving oscillation is performed along odd-numbered paths of the first path 320, the third path 324, and the fifth path 328; and the cutting-in uninvolving oscillation is performed along even-numbered paths of the second path 322, the fourth path 326, and the sixth path 330. Therefore, the oscillation command ON/OFF determination unit of the present embodiment determines whether an oscillation command is to be superimposed on a movement command, in such a manner that one cutting-in involving oscillation and one cutting-in uninvolving oscillation are alternately repeated in this order in the thread cutting, and outputs a superimposed command.

As shown in FIG. 4, the cutting-in uninvolving oscillation along the second path 322 is performed so as to include a part already machined in the cutting-in involving oscillation along the first path 320. (Although it is only necessary to include one part, in reality, as shown in FIG. 4 the part already machined having a predetermined size or larger is included, and this applies to the fourth path 326 and the sixth path 330.) Likewise, the cutting-in uninvolving oscillation along the fourth path 326 is performed so as to include a part already machined in the cutting-in involving oscillation along the third path 324; and the cutting-in uninvolving oscillation along the sixth path 330 is performed so as to include a part already machined in the cutting-in involving oscillation along the fifth path 328. This enables chips to be shredded in any one of the cutting-in uninvolving oscillation along the second path 322, the fourth path 326, and the sixth path 330 as well.

Like in the first embodiment, each cutting-in process involving oscillation does not include a part already machined by a different cutting-in process involving oscillation. For each cutting-in involving oscillation, oscillation conditions such as amplitude are set in such a manner that each cutting-in path is positioned more outward from the surface of the work 214 the radial direction. This enables chips to be shredded in each cutting-in involving oscillation as well.

Third Embodiment

Figure 5:
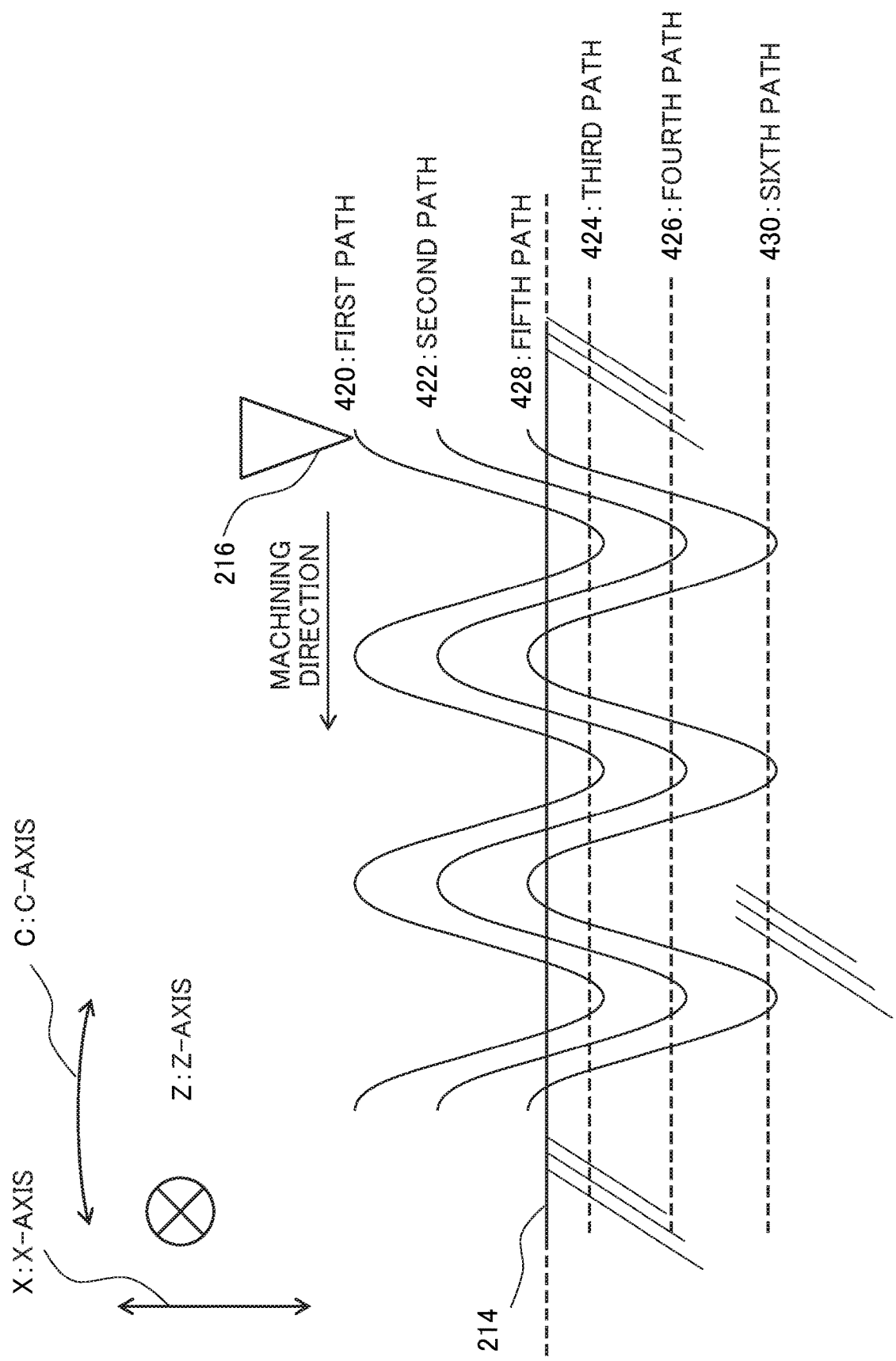
FIG. 5 is an explanatory view showing an example of thread cutting motion according to a third embodiment.

FIG. 5 is an explanatory view showing an example of thread cutting motion according to a third embodiment. The present embodiment differs from the first and second embodiments only in combinations of cutting-in involving oscillation and cutting-in uninvolving oscillation. In the present embodiment, two cutting-in motion involving relative oscillation between the work and the tool in the radial direction of the work and two cutting-in motion uninvolving oscillation are performed, and subsequently, one cutting-in motion involving oscillation and one cutting-in motion uninvolving oscillation are performed. Therefore, the oscillation command ON/OFF determination unit of the present embodiment determines whether an oscillation command is to be superimposed on a movement command so as to perform the thread cutting in such a manner, and outputs a superimposed command.

As shown in FIG. 5, the cutting-in uninvolving oscillation along the third path 424 is performed so as to include a part already machined in the cutting-in involving oscillation along the first path 420. (Although it is only necessary to include one part, in reality, as shown in FIG. 5, the part already machined having a predetermined size or larger is included, and this applies to the fourth path 426 and the sixth path 430.) Likewise, the cutting-in uninvolving oscillation along the fourth path 426 is performed so as to include a part already machined in the cutting-in involving oscillation along the second path 422; and the cutting-in uninvolving oscillation along the sixth path 430 is performed so as to include a part already machined in the cutting-in involving oscillation along the fifth path 428. This enables chips to be shredded in any one of the cutting-in uninvolving oscillation along the third path 424, the fourth path 426, and the sixth path 430 as well.

Like in the first embodiment, each cutting-in process involving oscillation does not include a part already machined by a different cutting-in process involving oscillation. For each cutting-in involving oscillation, oscillation conditions such as amplitude are set in such a manner that each cutting-in path is positioned more outward from the surface of the work 214 the radial direction. This enables chips to be shredded in each cutting-in involving oscillation as well.

While the embodiment of the present invention has been described in detail above, the foregoing embodiment merely shows specific examples in implementing the present invention. The technical scope of the present invention should not be limited to the foregoing embodiment. Various changes are applicable to the present invention within a range not deviating from the substance of the invention. All of those changes are also included in the technical scope of the present invention.

For example, without limitation to the embodiments described above, a combination of the cutting-in motion involving relative oscillation between the work and the tool in the radial direction of the work (oscillation motion) and the cutting-in motion uninvolving oscillation (non-oscillation motion) can be conceptually expressed by the following formula (1)

[Formula]

((oscillation motion)×m1+(non-oscillation motion)×n1)+((oscillation motion)×m2+(non-oscillation motion)×n2)+ . . . +((oscillation motion)×mL+(non-oscillation motion)×nL)   Formula (1)

[In Formula (1) above, m1 to mL and n1 to nL each represent a number of repetition and an integer of 1 to L.]

In other words, as represented in Formula (1) above, a superimposed command is output in such a manner that the thread cutting is configured to include one or more types of machining patterns combining an arbitrary number of the cutting-in involving relative oscillation between the work and the tool in the radial direction of the work (total movement command with an oscillation command added) and an arbitrary number of the cutting-in uninvolving oscillation (total movement command without the oscillation command added) (e.g. (oscillation motion)×m1 (non-oscillation motion)×n1, etc. in Formula (1) above), whereby various combinations of machining patterns are possible. Other combinations for the thread cutting are also possible, in which at least one cutting-in involving relative oscillation between the work and the tool in the radial direction of the work and at least one cutting-in uninvolving oscillation are alternately repeated in this order.

In the foregoing embodiment, oscillation is applied in the form of a sine wave as an example. Meanwhile, any cyclic waveform such as a rectangular wave or a triangular wave is applicable, for example. In the foregoing configuration described as an example, during machining by cutting in which oscillation is applied, a start point in the X-axis direction is shifted (namely, an offset is increased) in such a manner that the cutting proceeds gradually deeper in an order from the first path 220, the second path 222, to the third path 224. Increasing an offset for each path means locating a start point closer to the center of the work 214 for achieving a greater depth from the surface of the work 214.

Meanwhile, control may be exerted so as to increase an amplitude in the X-axis direction on gradually for each path without shifting a start point, for example. This control is exerted for the reason that increasing an amplitude for each path also allows machining by cutting to proceed gradually to a greater depth. The "greater depth" mentioned herein means a position deeper in the radial direction of the work 214, farther from the surface of the work 214, and closer to the spindle axis 218.

In the example described in the foregoing embodiment, oscillation is applied to the movement of the cutting tool 216. Meanwhile, the embodiment also includes a case where oscillation is applied to the work 214. Oscillation may also be applied to a different axis. Oscillation described in the embodiment is assumed oscillation between the work 214 and the cutting tool 216. As long as this oscillation is applied in the radial direction of the work 214, the oscillation can be realized by any axis.

The foregoing embodiment has been described on the assumption that oscillation assumes a sine wave, for example. Meanwhile, any waveform is applicable as long as it is a cyclic waveform and a frequency (cycle) can be defined in the waveform.

In the foregoing embodiment, an oscillation frequency has been described as an optional frequency. Alternatively, the oscillation frequency can be obtained by multiplying the rotation speed (rotation cycle) of a spindle axis by a predetermined constant (or dividing this rotation speed (rotation cycle) by the constant). If the rotation frequency of the spindle axis of a work is mhz (rotation cycle is 1/m second), for example, the oscillation frequency (cycle) can be a frequency of (n×m) hz (or can be a cycle of 1/(n×m) second). Here, n and in are positive integers. By setting the oscillation frequency by multiplying the frequency (number of rotations) of the spindle axis by a predetermined constant (integer) in this way, it becomes possible to shred chips into a constant length. The oscillation frequency can be set at a multiplication of the frequency (number of rotations) of the spindle axis by a constant by causing an operator to set an optional value as an oscillation condition (see FIG. 1) and give the set value to the oscillation command generation unit 104. Setting the oscillation frequency at a multiplication of the rotation speed of the spindle axis to rotate the work 214 by a predetermined constant is called "synchronizing the oscillation frequency with the spindle axis."

In the foregoing embodiment, the oscillation command generation unit 104 switches between two types of machining by cutting as follows: first, machining by cutting for making a cut with oscillation; and subsequent machining by cutting without application of oscillation. For this switching, the oscillation command ON/OFF determination unit 102 determines whether applying oscillation will cause influence on a final machining surface. However, a different criterion may be used for the determination.

EXPLANATION OF REFERENCE NUMERALS 10, 10a, 10b Thread groove
12 Screw
14, 214 Work
16, 216 Cutting tool
18 Spindle axis
100 Controller
102 Oscillation command ON/OFF determination unit
104 Oscillation command generation unit
106 Adder
108 Control unit
120 Motor
220 First path
222 Second path
224 Third path
20, 226 Depth of cut made by machining by cutting along first path
22, 228 Depth of cut made by machining by cutting along second path
230 Depth of cut made by machining by cutting along third path
232 Final machining surface
A Area
B Thread groove (finished state)
C C-axis
D Arrow
X X-axis
Z Z-axis

What is claimed is:

1. A controller for a machine tool used for thread cutting on a work by repeating motion of moving a tool in a rotary axis direction in synchronization with rotation of the work a plurality of times, while cutting-in in a radial direction, the controller comprising:
an oscillation command generation unit that generates an oscillation command for causing the work and the tool to oscillate relative to each other in the radial direction of the work based on a condition for oscillation;

a movement command generation unit that generates a movement command for causing the work and the tool to move relative to each other for thread cutting of the work;

an adder that adds the oscillation command and the movement command; and a determination unit that predetermines whether the oscillation command is to be added to the movement command, wherein the adder outputs a superimposed command configured to include one or more types of machining patterns that combine:

a plurality of total movement commands, each of the plurality of total movement commands including the movement command and the oscillation command, and a plurality of other total movement commands, each of the plurality of other total movement commands including the movement command without the oscillation command, wherein the superimposed command results in a repeated order where each total movement command is followed by a corresponding other total movement command, in accordance with a result of determination by the determination unit, and wherein a path of each total movement command intersects a corresponding path of the following other total movement command in the radial direction, wherein as the paths generated by the total movement commands and the corresponding paths generated by the other total movement commands increase, the tool moves deeper and closer to the center of the work, resulting in the thread cutting on the work.

2. The controller for the machine tool according to claim 1, wherein the determination unit inspects a machining program for the thread cutting on the work, and determines whether the oscillation command is to be added to the movement command.

3. The controller for the machine tool according to claim 1, wherein the determination unit outputs a command so as to be composed of the total movement command with the oscillation command added, until a cut made by the relative oscillation between the work and the tool in the radial direction of the work reaches the bottom of a thread groove as a target of the thread cutting, and outputs a command so as to be composed of the total movement command without the oscillation command added, after the cut made by the relative oscillation between the work and the tool in the radial direction of the work reaches the bottom of the thread groove as the target of the thread cutting.

4. The controller for the machine tool according to claim 1, wherein the oscillation command generation unit generates the oscillation command in such a manner that a part already machined by a different cutting-in process is absent in each cutting-in process with oscillation of causing the work and the tool to oscillate relative to each other in the radial direction of the work.

5. The controller for the machine tool according to claim 1, wherein the oscillation command generation unit generates the oscillation command for applying oscillation at an oscillation frequency obtained by multiplying the rotation speed of a spindle axis to rotate the work by a predetermined constant.

6. The controller for the machine tool according to claim 1, wherein the oscillation command generation unit generates the oscillation command in such a manner that, as the thread cutting on the work proceeds, the amplitude of the relative oscillation between the work and the tool in the radial direction of the work becomes greater for each path.

7. The controller for the machine tool according to claim 1, wherein the oscillation command generation unit generates the oscillation command in such a manner that, as the thread cutting on the work proceeds, an offset of the start position of the relative oscillation between the work and the tool in the radial direction of the work becomes greater for each path.

8. The controller for the machine tool according to claim 1, wherein the oscillation command generation unit generates the oscillation command in such a manner that each cutting-in process involving oscillation does not include a part already machined by a different cutting-in process involving oscillation, such that paths of each of the cutting-in processes involving oscillation do not intersect.

9. The controller for the machine tool according to claim 1, wherein all oscillations based on the oscillation command have a same phase.

* * * * *